2,888,828

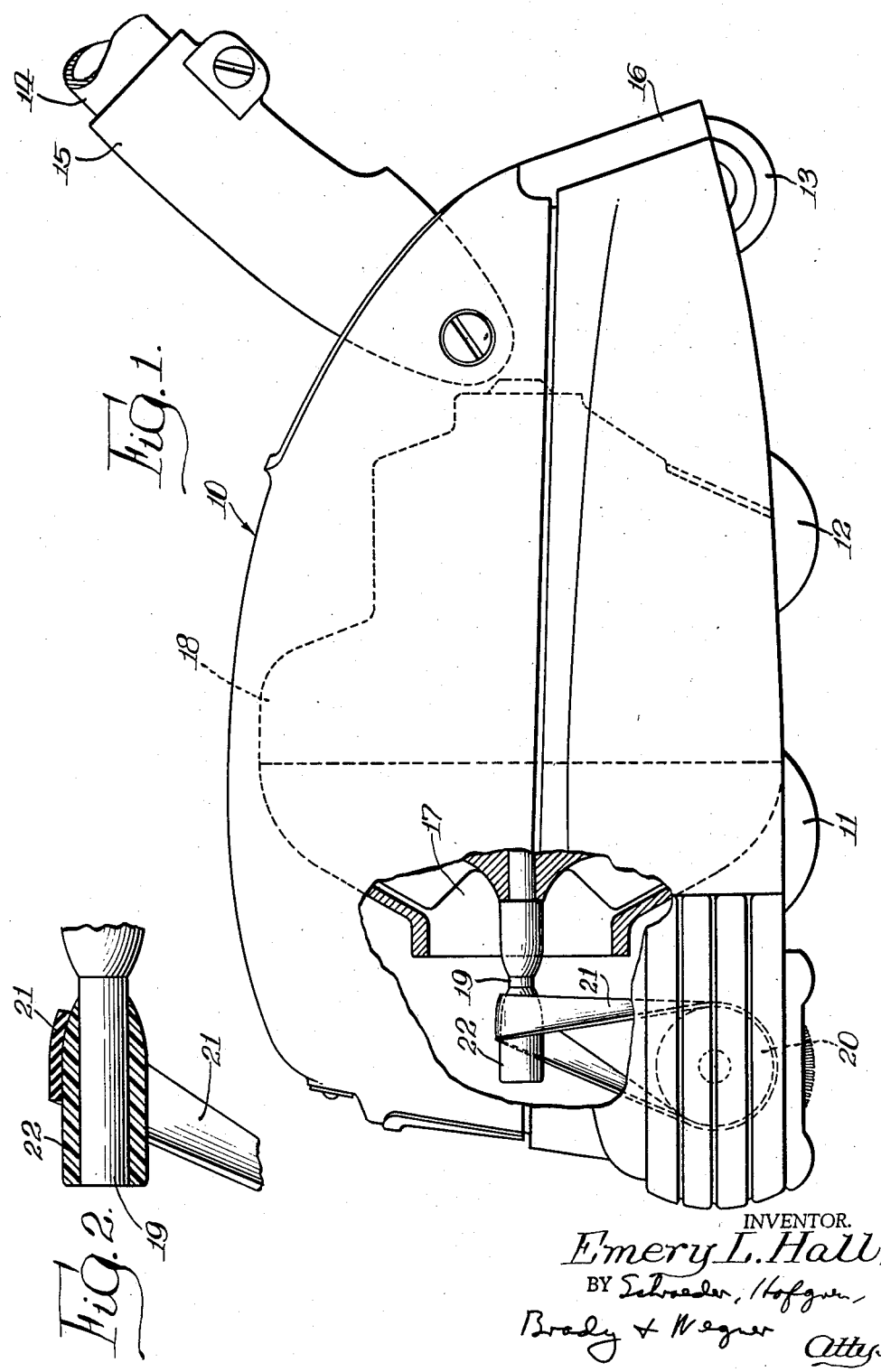

DRIVE APPARATUS

Emery L. Hall, Hinsdale, Ill., assignor to Whirlpool Corporation, a corporation of Delaware Application September 3, 1957, Serial No. 681,672

5 Claims. (Cl. 74—230.7)

This invention relates to apparatus for providing a friction drive to a drive belt or the like.

In belt drives where a rubber belt or other member is driven from a pulley or other such device excessive slippage often occurs, particularly where the pulley is of small diameter. This excessive slippage not only tends to waste power and wear out the belt but often will throw the belt from the pulley, especially where the pulley is not provided with side flanges but is in the shape of an extension of a motor shaft or the like.

The present invention either eliminates entirely or materially reduces the above-mentioned difficulties. This is accomplished by providing a solid polytrifluorochloroethylene friction member as a part of the friction drive apparatus. This polymer provides an increasing coefficient of friction with rise in the temperature. Thus if slippage occurs in the structure of this invention the frictional heat caused by the slippage increases the coefficient of friction of the polymer. Thus the drive efficiency of the apparatus is increased even when initial slippage occurs.

One of the features of this invention, therefore, is to provide an improved apparatus for a friction drive in which a friction member of polytrifluorochloroethylene is employed. Other features and advantages of the invention will be apparent from the following description of one embodiment thereof as shown in the accompanying drawings.

Of the drawings:

Figure 1 is a side elevational view, partially broken away, of a vacuum cleaner embodying the invention; and Figure 2 is an enlarged vertical sectional view of the belt contacting portion of the drive shaft.

The vacuum cleaner shown in the accompanying drawings comprises a casing 10 normally supported for movement on front wheels 11 and rear wheels 12. The casing also has attached thereto supporting wheels 13 positioned rearwardly of the wheels 12, with these wheels 13 being normally spaced above the floor as illustrated in Figure 1, but contacting the floor when the cleaner casing 10 is rotated rearwardly about the rear wheels 12.

In order to propel the cleaner over a floor or other surface to be cleaned, the cleaner has rotatably attached thereto a handle 14 held in a fitting 15 in the customary manner. A conventional filter bag (not shown) is attachable to the rear 16 of the cleaner and suspended from the handle 14.

A motor fan unit 18 is positioned in the casing 10 by normal means. A motor shaft 19 on which the fan 17 is mounted extends forwardly from the fan 17 so as to be positioned above the rotatable brush 20. The shaft 19 drives the belt 21 to rotate the brush 20.

The rigid polytrifluorochloroethylene collar 22 is press fitted on the drive shaft 19 which is contacted by the belt 21 and provides a high coefficient of friction for driving the belt 21. If when the driving operation is first commenced there is excessive slippage this slippage will cause a rise in temperature of the collar 22 which will increase its coefficient of friction to the point where the belt 21 will be driven with increasing efficiency. Actual tests have shown that even when the shaft 19 rotates initially without driving the belt 21 the temperature rise in the collar 22 soon becomes great enough to increase its coefficient of friction to the point where the belt 21 is grasped and driven by the rotating shaft and collar. Thus the polytrifluorochloroethylene friction member is instrumental in providing an efficient friction drive structure for a drive member such as the shaft 19 and associated structure and a driven member such as the ordinary rubber drive belt 21.

The polytrifluorochloroethylene, probably more properly called polytrifluoromonochloroethylene, is a rigid material containing three fluorine and one chlorine atom on each ethylene group. The preferred material has a molecular weight of at least 75,000 and preferably of about 75,000–110,000 and is a rigid thermoplastic material.

Having described my invention as related to the embodiment shown in the accompanying drawings, it is my intention that the invention be not limited by any of the details of description, unless otherwise specified, but rather be construed broadly within its spirit and scope as set out in the accompanying claims.

I claim:

1. Apparatus for providing a friction drive to a drive belt or the like, comprising: a rotatable shaft; and a friction member thereon of rigid polytrifluorochloroethylene normally in driving contact with said belt.

2. Apparatus for providing a friction drive to a drive belt or the like, comprising: a rotatable shaft; and a friction collar around said shaft of rigid polytrifluorochloroethylene normally in driving contact with said belt.

3. The apparatus of claim 2 wherein said collar is press fitted on said shaft.

4. Apparatus for providing a friction drive between a drive member and a driven member, comprising: a friction member of polytrifluorochloroethylene attached to one of said members and making frictional contact with the other member, said polytrifluorochloroethylene being capable of an increasing coefficient of friction with increasing temperature.

5. The apparatus of claim 4 wherein said friction member is attached to said drive member.

References Cited in the file of this patent

UNITED STATES PATENTS

| | | |
|---|---|---|
| 1,953,617 | Kitto | Apr. 3, 1934 |
| 2,039,461 | Sparling | May 5, 1936 |
| 2,437,362 | Rockoff | Mar. 9, 1948 |
| 2,701,971 | Carter et al. | Feb. 15, 1955 |
| 2,792,377 | Miller | May 14, 1957 |